(12) United States Patent
Mullikin

(10) Patent No.: US 7,259,872 B2
(45) Date of Patent: Aug. 21, 2007

(54) LIGHT BEAM SWITCH SYSTEM FOR LOCATING THE EDGE OF A WORKPIECE

(75) Inventor: Jeffrey A. Mullikin, Bourbonnais, IL (US)

(73) Assignee: Peddinghaus Corporation, Bradley, IL (US)

( * ) Notice: Subject to any disclaimer, the term of this patent is extended or adjusted under 35 U.S.C. 154(b) by 198 days.

(21) Appl. No.: 11/015,791

(22) Filed: Dec. 17, 2004

(65) Prior Publication Data

US 2006/0132805 A1    Jun. 22, 2006

(51) Int. Cl.
*G01B 11/14* (2006.01)
(52) U.S. Cl. ..................................... 356/622
(58) Field of Classification Search ............... 356/621, 356/622; 198/460.1, 781.05, 781.06
See application file for complete search history.

(56) References Cited

U.S. PATENT DOCUMENTS 3,642,117 A * 2/1972 Burt ........................ 209/539
5,304,027 A * 4/1994 La Barre et al. ......... 198/347.2
6,460,683 B1 * 10/2002 Pfeiffer .................... 198/460.1

OTHER PUBLICATIONS

Drawing 1.
Partial European Search Report for EP application 05 111 958-4-2302.
Photograph C.
Photograph D.

* cited by examiner

*Primary Examiner*—Roy M. Punnoose
(74) *Attorney, Agent, or Firm*—Wood, Phillips, Katz, Clark & Mortimer

(57) ABSTRACT

A system is provided for detecting or locating an edge of a workpiece in a processing path. The system includes a reflector which can be positioned at an elevation higher than the workpiece in the processing path. According to one aspect of the invention, the reflector can be mounted in a recess of a clamp which can be moved to engage the workpiece. The system also includes a light beam source and reflected light beam sensor located along one side of the processing path. According to another aspect of the invention, the light beam can be directed at an oblique angle through a corner of the processing path to the reflector. Interruption of the light beam changes the state of the sensor which indicates the location of the workpiece edge relative to the location of the light beam source along one axis of a mutually orthogonal three-axis coordinate system.

12 Claims, 16 Drawing Sheets

LIGHT BEAM SWITCH SYSTEM FOR LOCATING THE EDGE OF A WORKPIECE

TECHNICAL FIELD

This invention relates to a system for locating a workpiece edge (e.g., a leading end edge, a trailing end edge, or a side edge of stock (including, for example, a piece of structural steel) before or during processing of the workpiece. Such processing may involve conveying and severing a length of stock into one or more shorter length segments, drilling or punching holes, cutting profiles with a torch, etc.

BACKGROUND OF THE INVENTION AND TECHNICAL PROBLEMS POSED BY THE PRIOR ART

Fabrication of a structural workpiece (such as, for example, a structural steel I-beam, wide flange beam, angle, channel, flat plate, etc.) may require cutting, drilling, punching, and severing portions of the workpiece. Conventional machines perform these processing operations. For example, a machine can be used to drill holes in a workpiece (e.g., a structural beam).

In one type of machine, a workpiece, such as a structural beam, is supported lengthwise on, and clamped to, a table adjacent a drill carriage which supports a drill spindle so that a drill mounted thereto can be moved to desired locations along the length of the beam, along the height of the beam, and toward or away from the beam.

In some machines, the drill spindle can also be tilted (angled) in a plane that is perpendicular to the length of the beam support table and/or can be tilted (angled) in a plane that is parallel to the horizontal support surface of the beam support table.

In another type of machine, the beam or other workpiece is moved through an assembly of tools (e.g., punches, drills, etc.) which are at fixed locations along the length of the machine.

Structural beams may have to be provided in appropriate lengths for being erected in specific structures. Methods for creating one or more shorter segments or beams from a length of stock include severing the shorter segments from the length of stock with a cutting torch or with a shearing apparatus.

When beams are erected in structures, the ends of the beams and/or other portions of the beams are typically connected together with bolts. The bolts are received in holes provided in the webs and flanges of the beams.

Conventional methods for providing the bolt holes in a beam include drilling the holes with one or more drill spindles, or punching the holes with one or more punch presses. For example, "web" punch presses may be used to provide holes in the beam web, and "flange" punch presses may be used to provide holes in the beam flanges. Such punch presses may have conventional designs well-known to those skilled in the art. Various designs are disclosed in U.S. Pat. Nos. 4,631,996, 3,722,337, and 3,720,125.

Other systems for processing a beam or other workpiece may include apparatus having cutting torches for cutting the workpiece to length or cutting a profile in the workpiece. Various processes may be combined in one machine, or in one processing line having a number of different machines.

There is typically a need, at some point in the process (usually at an initial stage of the process), to determine the location of the workpiece relative to the process line or path (i.e., relative to the various tools that cut, shear, punch, drill, or otherwise operate on the workpiece at the desired locations along the workpiece). Typically, a leading end edge of a workpiece is determined (i.e., established or located) relative to a predetermined position of the operating tool or tools and/or relative to a fixed portion of the process line or machine in the process line so that subsequent processing operations can be programmed and/or performed relative to the initial location data of the leading end edge of the workpiece. In some processes, the trailing end edge of a workpiece may instead, or subsequently, be located (i.e., determined relative to the operating tools). In some other processes, a lateral edge or edges of a workpiece must be located.

In a typical workpiece processing apparatus or processing line, the ambient environment or atmosphere may be relatively dirty as a result of sloughing of rust or scale from the workpiece and/or as a result of the production of the chips and smoke from drilling and/or cutting operations. In addition, the ambient atmosphere can typically include spray mist coolant from coolant liquids that are used during drilling or cutting operations. The relatively dirty ambient atmosphere around the workpiece must be accommodated by any system employed for determining or locating an edge of a workpiece.

Mechanical systems for detecting the edge of a workpiece have been used in the past and continue to be used today. Such mechanical systems do not need to "see" through the dirty ambient atmosphere that envelopes the workpiece, but such mechanical systems are nevertheless subject to the effects of particulates, gases, and liquid materials that are present in the environment around the workpiece and that may over time foul operating components.

A typical mechanical system for locating an edge of a workpiece includes a spring-loaded mechanical switch that physically engages the workpiece. However, this subjects the switch component or components to physical wear and to potential physical damage. Such a mechanical system also requires a significant amount of room (typically for accommodating a support arm, springs, electronic switches to sense motion, etc.). Such a mechanical system thus typically needs to be offset from the operating tool (e.g., drill, cutting torch, etc.). This may require the machine to be longer and/or to require the workpiece or tool to undergo extra travel.

Some of the above-discussed disadvantages of a mechanical system for locating the edge of a workpiece can be eliminated or minimized by using an optical system employing a light beam directed transversely into the processing path of the workpiece so that the beam is perpendicular to the length of the workpiece and parallel to the width direction of the workpiece. When the light beam is interrupted by the leading edge of the workpiece, the light beam is reflected by the surface of the workpiece back to a photoelectric cell switch near the light source. This actuates the switch for indicating the location of the workpiece leading edge. In such a system, the light emitting source must be very near the workpiece path because smoke, mist, and chips can interfere with the transmission of the light beam that is directed at, and reflected from, the workpiece. Further, color and/or texture changes in the workpiece materials, along with changes in the distance between the workpiece and the switch, can cause problems in actuating the switch with the reflected light beam. Such a reflected light beam type of switching system may thus be somewhat inaccurate and/or unreliable.

It would be desirable to provide an improved system for locating an edge of a workpiece wherein the above-discussed problems could be eliminated, or at least substantially minimized.

It would be especially beneficial if such an improved system could operate effectively to locate the edge of a workpiece in an environment that is dirty, and wherein drill chips and spray mist coolant might be thrown or dispersed around the workpiece.

Such an improved system should preferably eliminate or minimize the likelihood of the workpiece or other objects in the environment from physically impacting or engaging the edge locator system in a way that could have a deleterious effect on the system.

It would also be desirable if such an improved system could be readily operated by an appropriate control system, could accommodate a variety of different types of workpieces (e.g., flat plates, channels, angles, beams, etc.), could produce accurate and repeatable results, and could relatively easily accommodate changes in the types and sizes of the workpieces being processed.

Also, it would be beneficial if such an improved system could employ components that are relatively small and that are relatively easy to fit in an existing processing machine or line.

Further, it would be advantageous if the improved system could be manufactured, installed, and operated without incurring excessive costs or expenses.

SUMMARY OF THE INVENTION

The present invention provides a novel, improved system that locates a workpiece edge and that can accommodate designs having the above-discussed benefits and features.

According to one aspect of the invention, the system employs a light beam sensor, a light beam reflector, and a light beam source for emitting a light beam which (1) is directed to the reflector, and (2) is oriented to be interrupted by a portion of a workpiece.

In one preferred form of the invention, a commercially available combination laser light source and sensing switch device, known as a "laser sensor switch." The laser sensor switch is mounted along the side of a workpiece processing line or path, and the laser sensor switch functions to both emit a light beam into the processing path and receive (sense) a reflected light beam from the processing path wherein the switch is maintained in a first switched state by the presence of the reflected light beam and is maintained in a second switched state by the absence of any reflected light beam. The laser sensor switch is initially positioned slightly beyond a leading end face of the workpiece so as to direct a light beam at an oblique angle transversely through only part of the projected cross section of the workpiece to a reflector located above or below the processing path. The reflector is positioned in line with the angled light beam above or below the workpiece path so as to reflect the light back to the sensor in the laser sensor switch. The light beam is thus oriented for being interrupted by a "corner" of the workpiece either when the light beam is subsequently moved along the path to the workpiece, or when the workpiece is moved along the path into the light beam.

In a machine where the workpiece is held stationary during processing with a movable tool or tools, the reflector and the laser sensor switch (containing the laser light source and sensor) can be initially located at a predetermined distance from the tool along the longitudinal (lengthwise) axis of the processing path, and can then be moved together (with or without the tool) along the lengthwise processing path relative to the stationary workpiece. If the machine is of the type where the workpiece is moved along the processing path relative to a tool, then the light source, sensor, and reflector can be mounted at stationary locations in the machine.

In another form of the invention, a regular, non-laser light source (e.g., full spectrum) can be arranged to direct a light beam past an end of a workpiece to a reflector which reflects the light beam back to a separate photoelectric cell sensor switch mounted near the light source.

With either of the above-discussed forms of the invention, the reflector is preferably mounted in a protective recess or enclosure that has an opening. The opening serves to (1) admit the light beam transmitted at an angle across a portion of the width of the processing path from the light source, and (2) allow the reflected light to be directed back to the light sensor switch. Interruption of the reflected light beam by a corner edge of the workpiece actuates the sensor switch to identify the workpiece edge location along the path relative to the known longitudinal location of the sensor switch adjacent the path. The switch may be either (1) a stationary switch having a predetermined location, or (2) a movable switch that can be moved together with the light source and reflector along the length of the workpiece while the location of the moving switch is continuously tracked and recorded by the machine control system.

Owing to the oblique angle of the light beam across the processing path, the light beam does not have to travel all the way across the entire width of a processing path. Thus, the reflector can be mounted on a support that is closer to the sensor switch and/or that is in a more protected orientation so the reflector is less likely to be deleteriously affected by accidental impacts and/or other potentially interfering substances in the processing path. The support on which the reflector is mounted may be a movable support or may a fixed support (depending on whether the light source and sensor switch are either movable together with the reflector relative to the workpiece or instead are fixed relative to a moving workpiece). In one preferred form, the support in which the reflector is mounted is part of the workpiece clamp which holds the workpiece in the processing path while a tool is operated on the workpiece. A recess is defined in the engaging surface of the clamp, and the reflector is mounted at an angle in the recess. When the clamp is in an elevated position prior to receiving the workpiece, the reflector is in line with the obliquely angled light beam.

The recess in the clamp can be located very near the actual work spindle of the drill in the machine. The recess in the clamp minimizes the likelihood of damage to the reflector when the clamp is not engaged with the workpiece and also protects the reflector from damage when the workpiece is clamped during the processing of the workpiece. Further, because the reflector can be always maintained the same distance from the light source (e.g., laser sensor switch) when the clamp is at a predetermined initial elevation above the workpiece, there is no deviation when the switch trips as the light beam is broken.

Preferably, the preferred embodiment of the light source and switch is a combination light source and light sensing switch device, such as a laser sensor switch, which is mounted within a housing having a small aperture for the light beam. The housing aperture can be closed by a shield when the laser beam is not needed. The shield can be opened, preferably automatically, to allow the light beam to travel from the laser sensor switch into the processing path and to allow the reflected light beam from the reflector back into the laser sensor switch. When the shield closes the aperture in the housing, the laser sensor switch is sealed from outside contaminants.

One general aspect of the invention may be characterized as a system for locating an edge of a workpiece in a processing path, wherein the system comprises:

(A) a light source that
  (1) is located laterally adjacent the processing path, and
  (2) is oriented to emit a light beam at an oblique angle relative to the width of the processing path so that the emitted light beam can be directed to
    (a) pass transversely through only a portion of the projected transverse cross section of the workpiece in the processing path beyond the workpiece, and
    (b) extend to a target region adjacent the processing path;
(B) a sensor switch for receiving a reflected light beam wherein the switch is maintained in a first switched state (or actuated state) by the presence of a reflected light beam and is maintained in a second switched state (or neutral state) by the absence of a reflected light beam; and
(C) a reflector at the target region for reflecting the light beam to the sensor switch when the light beam is not interrupted by the workpiece.

Another aspect of the invention may be characterized as a system for locating an edge of a workpiece in a processing path, wherein the system comprises:

(A) a clamp for engaging the workpiece, the clamp defining a recess that opens toward the processing path, the clamp being movable toward and away from the processing path between a first, retracted position spaced from the workpiece and a second, extended position engaging the workpiece;
(B) a reflector in the clamp recess;
(C) a light source that
  (1) is located laterally adjacent the processing path,
  (2) is oriented to emit a light beam directed to the reflector when the clamp is in the first, retracted position; and
(D) a sensor switch that can receive the light beam reflected from the reflector wherein the switch is maintained in a first switched state by the presence of the reflected light beam and is maintained in a second switched state by the absence of the reflected light beam. In this aspect of the invention, the light beam can be emitted across the entire width of the processing path, or across just a corner of the path, to the reflector recessed in the clamp.

In either aspect of the invention, the presently preferred arrangement includes a sensor switch and light source which are each part of a laser sensor switch that operates to emit the light beam in the form of a laser light beam, and that operates to sense the presence or absence of a reflected laser light beam (wherein the laser sensor switch is maintained in a first switched state (e.g., actuated state) by the presence of the reflected laser light beam and is maintained in a second switched state (e.g., neutral state) by the absence of the reflected laser light beam).

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 shows a portion of the near end of the single spindle drill line partially broken away to show some interior details;

FIG. 3 illustrates portions of the structure cut away to illustrate interior details;

DESCRIPTION OF THE PREFERRED EMBODIMENT

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the apparatus operating in accordance with the process of this invention is described in the normal (upright) operating position, and terms such as upper, lower, horizontal, etc., are used with reference to this position. It will be understood, however, that the apparatus of this invention may be manufactured, stored, transported, used, and sold in an orientation other than that described.

The apparatus operating in accordance with the process of this invention can have certain conventional components and control mechanisms the details of which, although not fully illustrated or described, will be apparent to those having skill in the art and an understanding of the necessary functions of such components and mechanisms.

Some of the Figures illustrating an embodiment of the apparatus operating in accordance with the process of the present invention show conventional structural details and mechanical elements that will be recognized by one skilled in the art. However, the detailed descriptions of such elements are not necessary to an understanding of the invention, and accordingly, are herein presented only to the degree necessary to facilitate an understanding of the novel features of the present invention.

Figure 1:
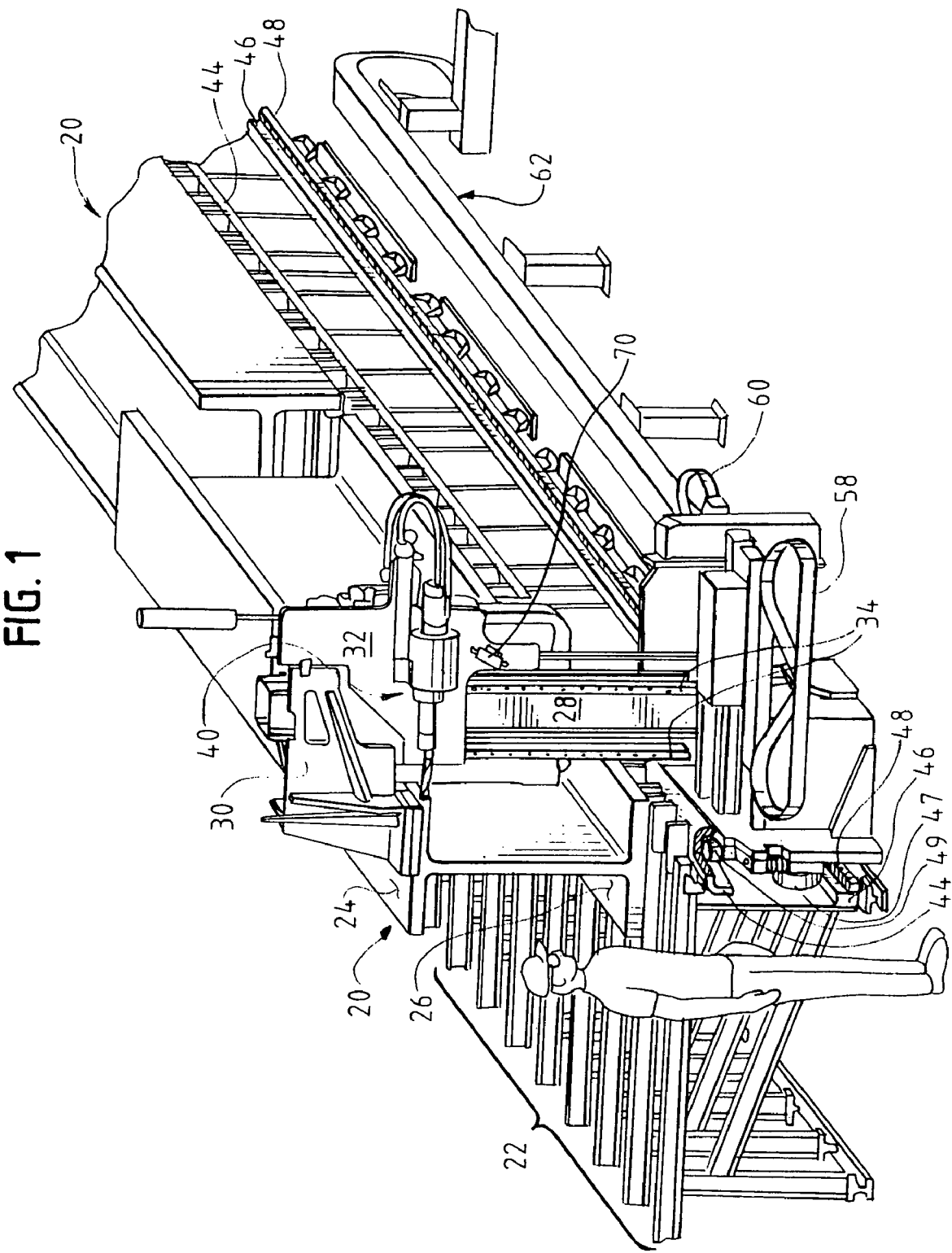
FIG. 1 is a fragmentary, perspective view of a single spindle drill line incorporating the system of the present invention.

FIG. 1 shows a typical line or machine for processing a structural steel beam or other workpiece 20 and which incorporates the system of the present invention for locating an edge of the workpiece 20. For ease of illustration, some of the components and assemblies of the machine have been omitted. The line or machine includes a processing path along which a length of stock, such as a structural steel beam or other workpiece 20, can be positioned. One presently contemplated commercial form of the line or machine employing the system of the present invention is a modification of the apparatus manufactured and sold in the United States of America under the designation "Single Spindle Drill Line MDL 1000/1" by Peddinghaus Corporation, Bradley, Ill., U.S.A.

The drill line includes an in-feed table or material table 22 (FIG. 1) which includes horizontally disposed, spaced-apart channels mounted on a frame system. The in-feed table 22 supports the workpiece 20 in which holes are to be drilled at predetermined locations. The workpiece 20 is a structural steel member, such as the wide flange beam shown, wherein the beam has an upper flange 24 and a lower flange 26 which rests upon the in-feed table 22.

In the single spindle drill line sold by Peddinghaus Corporation under the designation MDL 1000/1, the workpiece 20 is initially positioned on the table 22 and is then held stationary on the table 22 while the drilling mechanism is moved to drill the holes at various locations in the stationary workpiece. In other processing line systems, the drilling mechanism could instead remain stationary, and the workpiece could be moved forwardly and rearwardly as necessary to permit drilling of the holes at predetermined locations in the workpiece.

In the presently contemplated preferred commercial embodiment of the single spindle drill line illustrated in FIG. 1, the line includes a Y-axis frame 28 which is adapted to move forwardly and rearwardly along the X-axis that is defined as an axis or path parallel to the length of the in-feed table 22.

The Y-axis frame 28 supports two vertically movable subassemblies: (1) a workpiece clamping assembly known as a vertical hold-down 30, and (2) a spindle axis plate 32. The Y-axis frame 28 is generally vertically oriented in a typical installation in the line or machine illustrated in FIG. 1, and the Y-axis frame 28 may be characterized as defining a generally vertically aligned Y-axis that is perpendicular to the X-axis and that defines a path along which the vertical hold-down 30 and spindle axis plate 32 can be moved vertically upwardly and downwardly together as well as separately. The vertical hold-down 30 and the spindle axis plate 32 are each mounted for vertical movement on linear ways 34. The linear ways 34, along with the mechanisms for mounting and vertically moving the hold-down 30 and spindle axis plate 32 on the linear ways 34, may be of any suitable conventional or special designs, the details of which form no part of the present invention.

Figure 2:
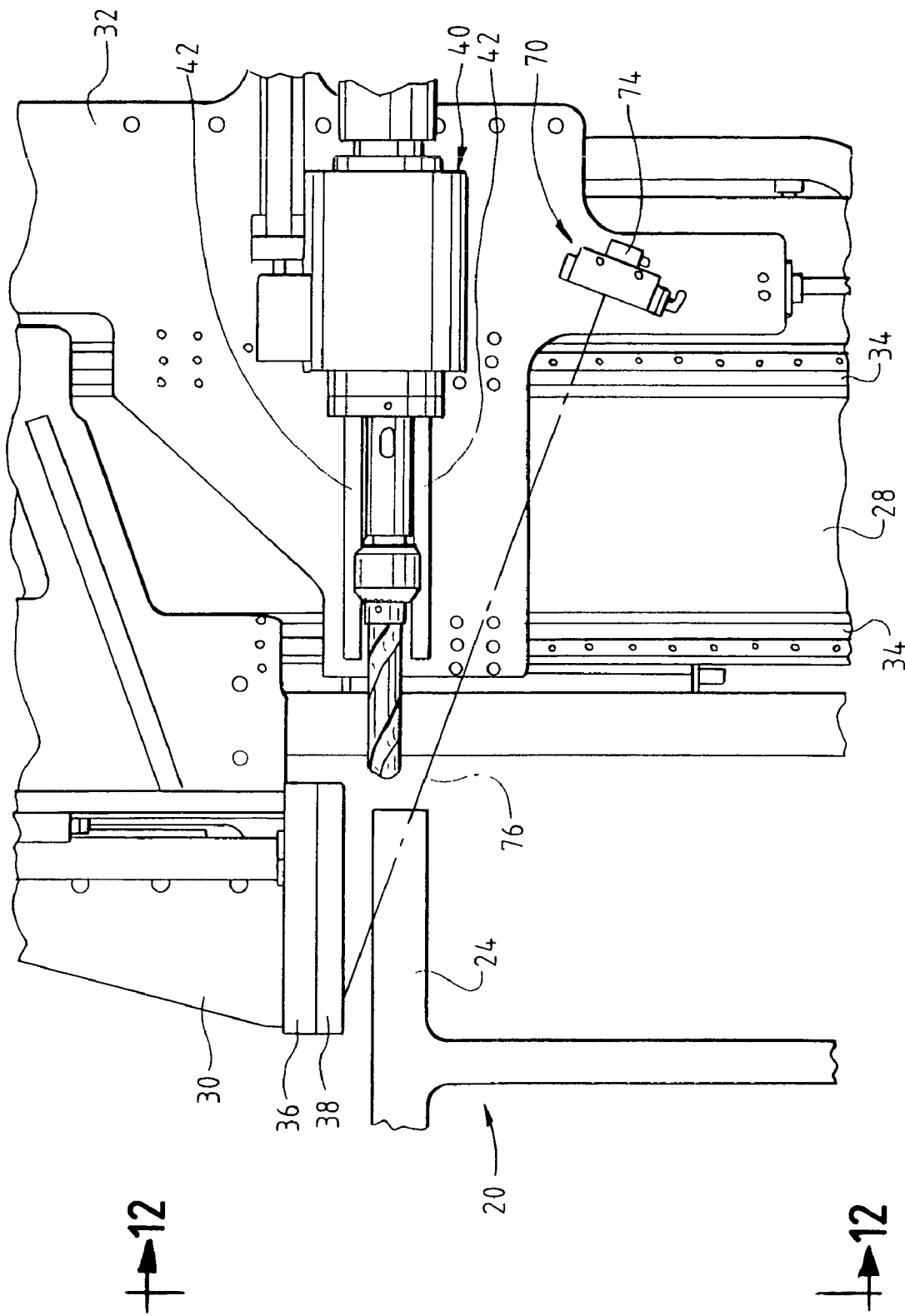
FIG. 2 is a fragmentary, enlarged, front end view of the single spindle drill line shown in FIG. 1.

As can be seen in FIG. 2, the vertical hold-down 30 includes a lower plate 36 to which is mounted a clamp pad 38 for contacting the top or upper surface of the workpiece upper flange 24 when the vertical hold-down 30 is moved downwardly to effect clamping engagement of the workpiece 20 on the in-feed table 22.

As shown in FIG. 2, the spindle axis plate 32 carries a drill spindle 40 which is mounted to, and is movable on, a pair of drill spindle linear ways 42. The drill spindle 40 is movable horizontally toward and away from the workpiece 20. The linear ways 42, along with the mechanisms for supporting and moving the drill spindle 40 on the linear ways 42, may be of any suitable conventional or special design, the details of which form no part of the present invention.

The Y-axis frame 28 is itself supported on the frame of the in-feed table 22 for movement forwardly and rearwardly along the X-axis path parallel to the length of the workpiece 20. To this end, the frame of the in-feed table 22 includes an upper retainer channel 44, a lower support bar 46, and a gear rack 48. The Y-axis frame 28 includes lower rollers 47 mounted on horizontal axes for supporting the weight of the Y-axis frame on the upwardly facing, horizontal, top surface of the lower support bar 46. The Y-axis frame 28 also includes upper rollers 49 mounted on vertical axes extending inside the upper retention channel so that the upper rollers engage the leg of the upper retention channel 44 that is adjacent the Y-axis frame 28 and holds the Y-axis frame 28 from falling away from the in-feed table 22. The bottom portion of the Y-axis frame 28 also carries a roller (not visible) mounted on a vertical shaft so that the roller bears against the exterior, vertical, side surface of the lower support bar 46, and this helps to further maintain the Y-axis frame 28 in the vertical orientation.

A horizontally disposed gear shaft (not visible) extends from the bottom of the Y-axis frame 28 and supports a spur gear (not visible in the figures) which is engaged with the rack gear 48. The spur gear is rotated by a motor (not visible) which is mounted on the lower part of the Y-axis frame 28 so that engagement of the rotating spur gear with the gear rack 48 drives the entire Y-axis frame 28 forwardly or rearwardly along the gear rack 48 adjacent the in-feed table 22.

The above-described mechanisms for supporting and moving the Y-axis frame 28 along the in-feed table 22 may be of any suitable conventional or special design, the details of which form no part of the present invention. It will also be appreciated that, in an alternate embodiment (not illustrated), the Y-axis frame 28 may be installed at a fixed location along the X-axis, and the workpiece 20 may instead be moved by appropriate special or conventional workpiece-moving mechanisms, forwardly and rearwardly along the X-axis relative to such a fixed Y-axis frame. The design and operational details of such an alternative workpiece moving system form no part of the present invention.

Power is supplied to the (1) operating mechanisms (for operating the drill, and for moving the Y-axis frame 28, the hold-down 30, the plate 32, the drill spindle 40, etc.), and (2)

control systems through an appropriate electrical distribution system which includes, in part, an electrical cable track 62 (FIG. 1). The electrical cables connected to various components have been omitted from the figures for ease of illustration. Similarly, components which are pneumatically operated are connected with pneumatic hoses to an operating fluid pressurization system, and such hoses and system have been omitted for ease of illustration. The details of the designs of such electrical power systems, control systems, and pneumatic systems form no part of the present invention.

Because the Y-axis frame 28 moves forwardly and rearwardly along the in-feed table 22 in the preferred embodiment, it is desirable in many applications to provide safety bumpers on the Y-axis frame 28. As shown in FIG. 1, a spring-type safety bumper 58 is provided on one side of the Y-axis frame 28, and a spring-type safety bumper 60 is provided on the other side of the Y-axis frame 28.

Typically, one or more holes are to be drilled in the beam or other workpiece 20 with the drill spindle 40. In order to determine the position along the X-axis (i.e., along the length of the workpiece 20) where each hole is to be drilled, the X-axis distance from the center of each planned hole to either the rear end or front end of the workpiece 20 can be used. This requires initially determining where the rear end or front end of the workpiece is, and how that position of the rear end or front end of the workpiece 20 is related to the X-axis position of the drill spindle 40 on the Y-axis frame 28.

According to the preferred embodiment of the present invention, the location of the rear end or front end of the workpiece 20 is sensed or detected relative to the Y-axis frame 28, and then the Y-axis frame 28 is moved along the X-axis to a selected X-axis position so that the drill spindle 40 can drill a hole. The vertical position, or Y-axis position, of the drill spindle 40 can be determined from its relationship either to the bottom of the workpiece 20 on the in-feed table 22 or to the top of the workpiece 20 as engaged by the vertical hold-down 30, and then the spindle axis plate 32 is moved vertically on the Y-axis frame 28 a desired distance relative to the bottom or top of the workpiece 20.

To locate, detect, or sense the position of the rear end or front end of the workpiece 20 along the X-axis, the system of the present invention provides three main elements: a light source for emitting a light beam, a reflector for reflecting the light beam, and a sensor for sensing the reflected light beam. This system, described in detail hereinafter, is located so that when relative movement between the workpiece 20 and the light beam causes the light beam to become blocked by the end of the workpiece, then there will be no reflection of the light beam back to the sensor. According to the present invention, the light source and sensor are mounted on the Y-axis frame 28 (that is movable along the X-axis) so that when the sensor no longer senses the reflected light beam which is blocked by the end of the workpiece 20, that condition signifies the location of the end edge of the workpiece 20 as being aligned with the sensor at that point along the X-axis. Because the light source and sensor are mounted at a fixed location on the Y-axis frame 28 in a fixed distance relationship along the X-axis relative to the mounted location of the drill spindle 40 on the Y-axis frame 28, the X-axis distance between the drill spindle 40 and the end of the workpiece 20 is then necessarily known.

Figure 5:
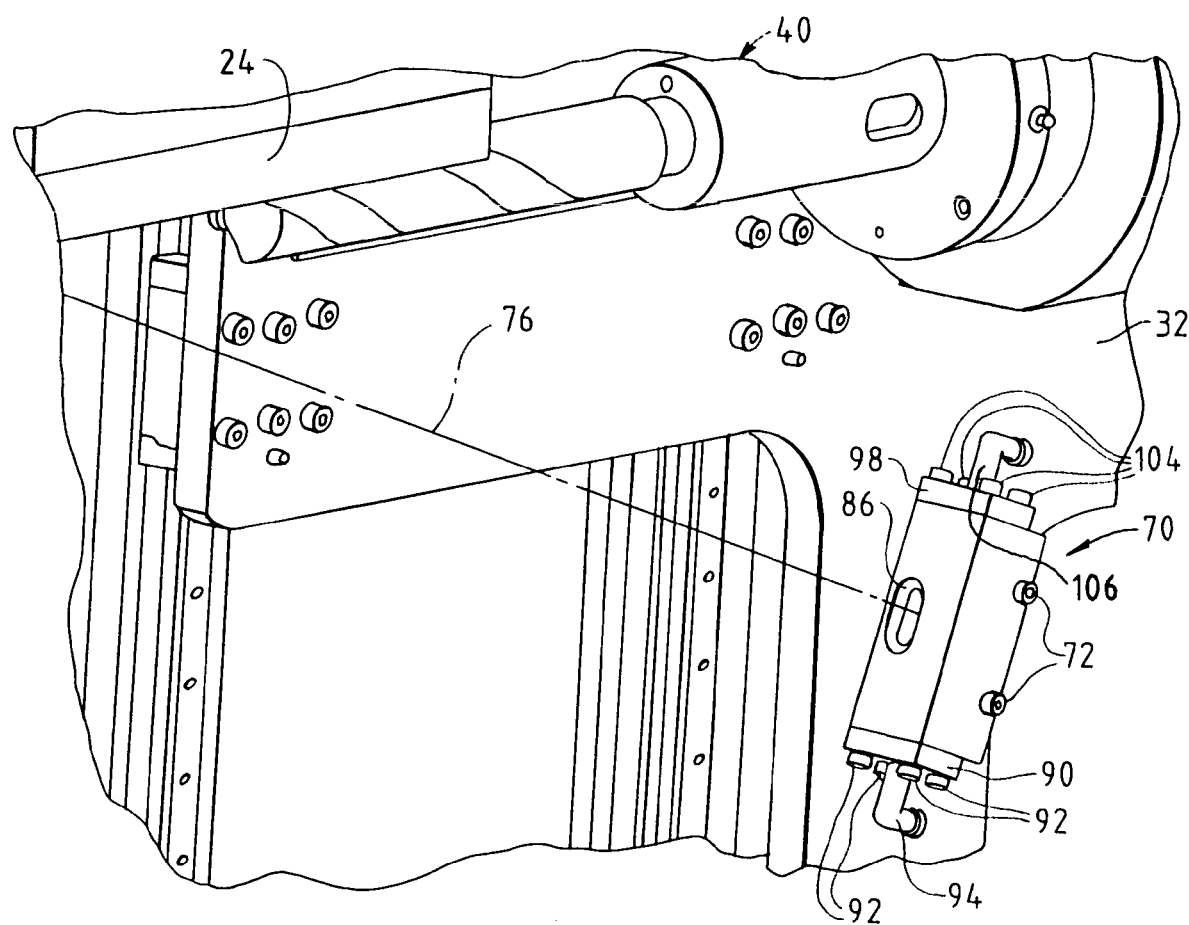
FIG. 5 is a fragmentary, perspective view of the laser sensor switch assembly shown in FIG. 2.

According to a presently preferred form of the present invention, the light source is located laterally adjacent the workpiece processing path at a fixed location on the Y-axis frame 28. Further, in the presently preferred form of the invention, both the light source and light sensor switch are contained within a housing or switch block 70 (FIGS. 1, 2, 3, 5, 6, 7, 8, 10, 11, 12, 13, and 15). As shown in FIG. 5, the switch block 70 is mounted on the face of the spindle axis plate 32 with a pair of cap screws or bolts 72.

Figure 6:
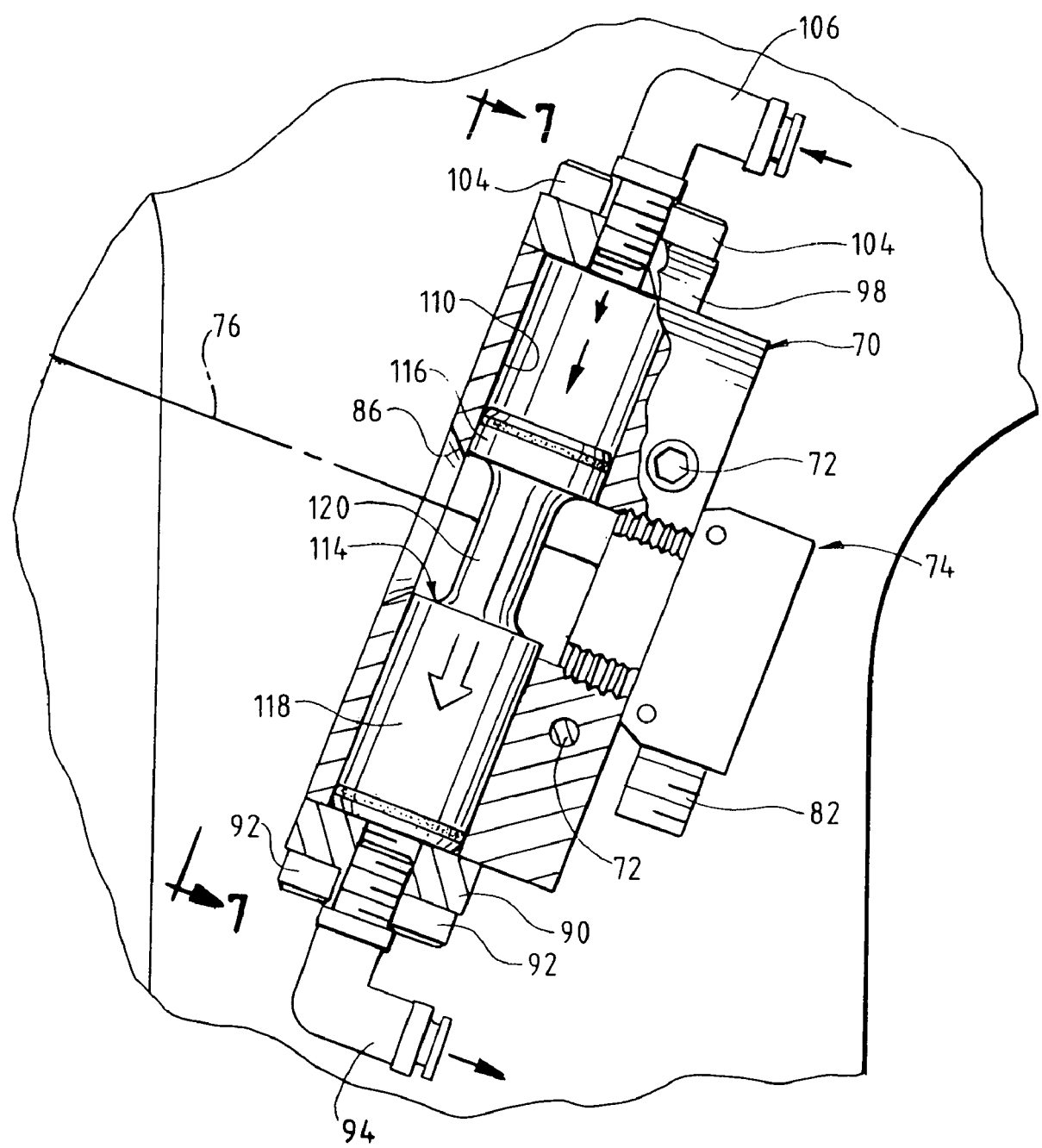
FIG. 6 is an enlarged, front view of the laser sensor switch assembly shown in FIG. 5, and in FIG. 6 portions of the structure have been broken away to illustrate interior details showing the spool or actuator in a lowered, opened position permitting the laser light beam to exit the laser sensor switch assembly housing.
Figure 8:
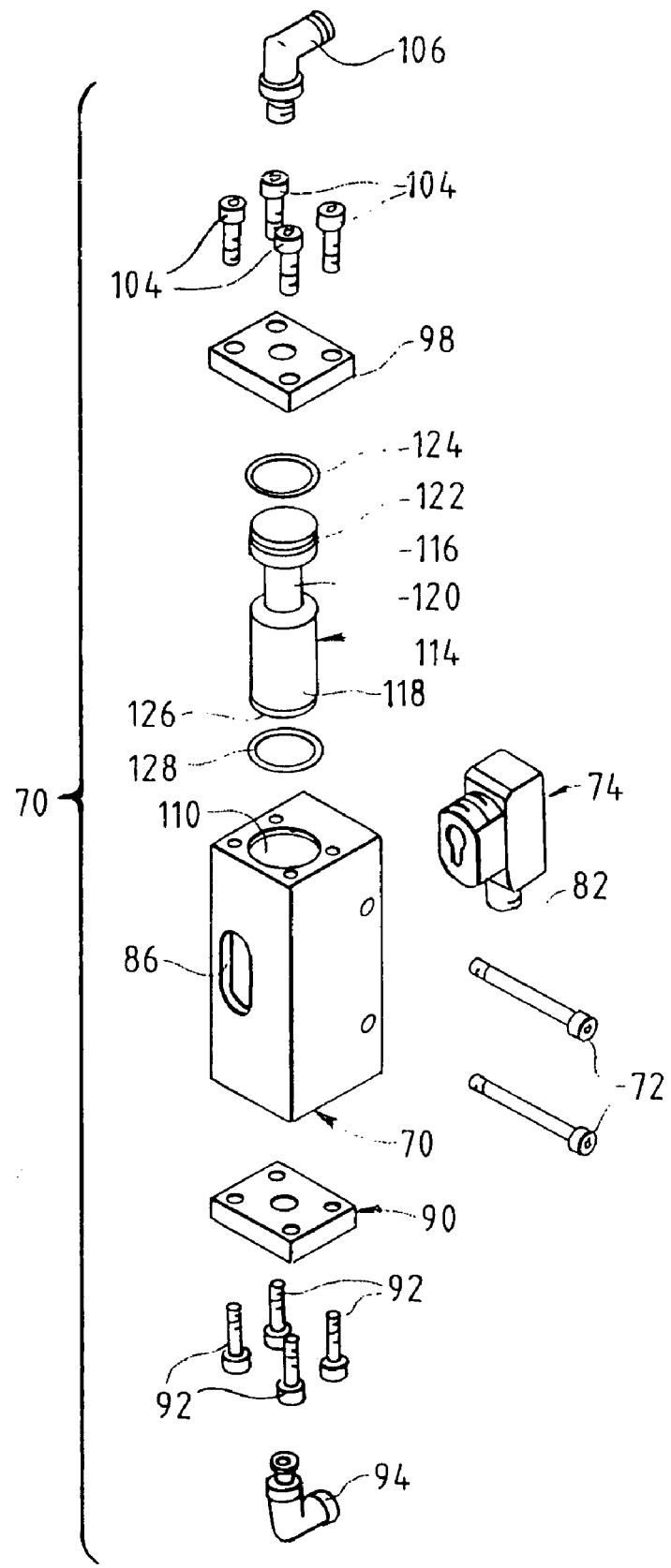
FIG. 8 is an exploded, perspective view of the laser sensor switch assembly, including the laser sensor switch and housing components therefor.

As can be seen in FIGS. 6 and 8, the preferred embodiment employs a light source and sensor switch in the form of a combination laser sensor switch 74 which is mounted to the housing or switch block 70. One presently contemplated, preferred form of the laser sensor switch 74 is sold in the United States of America under the model designation "World-Beam QS30 Series," Part No. QS30LLPCQ, by Banner Engineering Corp., 9714 10$^{th}$ Avenue North, Minneapolis, Minn. 55441. Other suitable conventional or special laser sensor switches may be employed.

In other forms of the invention, other light sources, including full spectrum light sources, could be used— depending upon operating conditions, distances, sensors, etc. In the preferred embodiment illustrated, the combination laser sensor switch 74 is operated to (1) emit a laser light beam 76 (FIG. 3), and (2) receive a reflection of the laser light beam from a reflector 80 in the vertical hold-down 30 (FIG. 4). The reflected laser light beam is sensed by an internal sensor (not visible) which is located adjacent the laser light beam source within the laser sensor switch 74. Electrical power to the components in the laser sensor switch 74 is introduced through a conduit (not illustrated) connected to a fitting 82 (FIG. 6) at the bottom of the laser sensor switch 74. The details of the structure and design of the laser sensor switch 74, per se, form no part of the present invention.

The front of the switch block 70 defines an elongate aperture 86 (FIG. 8) to accommodate the laser light beam emitted from the laser light source in the laser sensor switch 74 and to accommodate entry of the reflected light beam back into the light sensing device (sensor) in the laser sensor switch.

The bottom end of the switch block 70 is sealed with a bottom plate or cap 90 (FIGS. 3 and 5-7) which is mounted with four cap screws or bolts 92 (FIGS. 5 and 8). A pneumatic system elbow fitting 94 is mounted in the bottom cap 90, and communicates through the bottom cap 90 with the interior of the switch block 70.

The top end of the switch block 70 is sealed with a top plate or top cap 98 mounted by means of four cap screws or bolts 104 (FIGS. 3 and 5-7). A pneumatic system elbow fitting 106 is mounted in the top cap 98, and communicates through the top cap 98 with the interior of the switch block 70.

The pneumatic elbow fittings 106 and 94 are connected with a pneumatic control system through pneumatic hoses (not illustrated).

Figure 7:
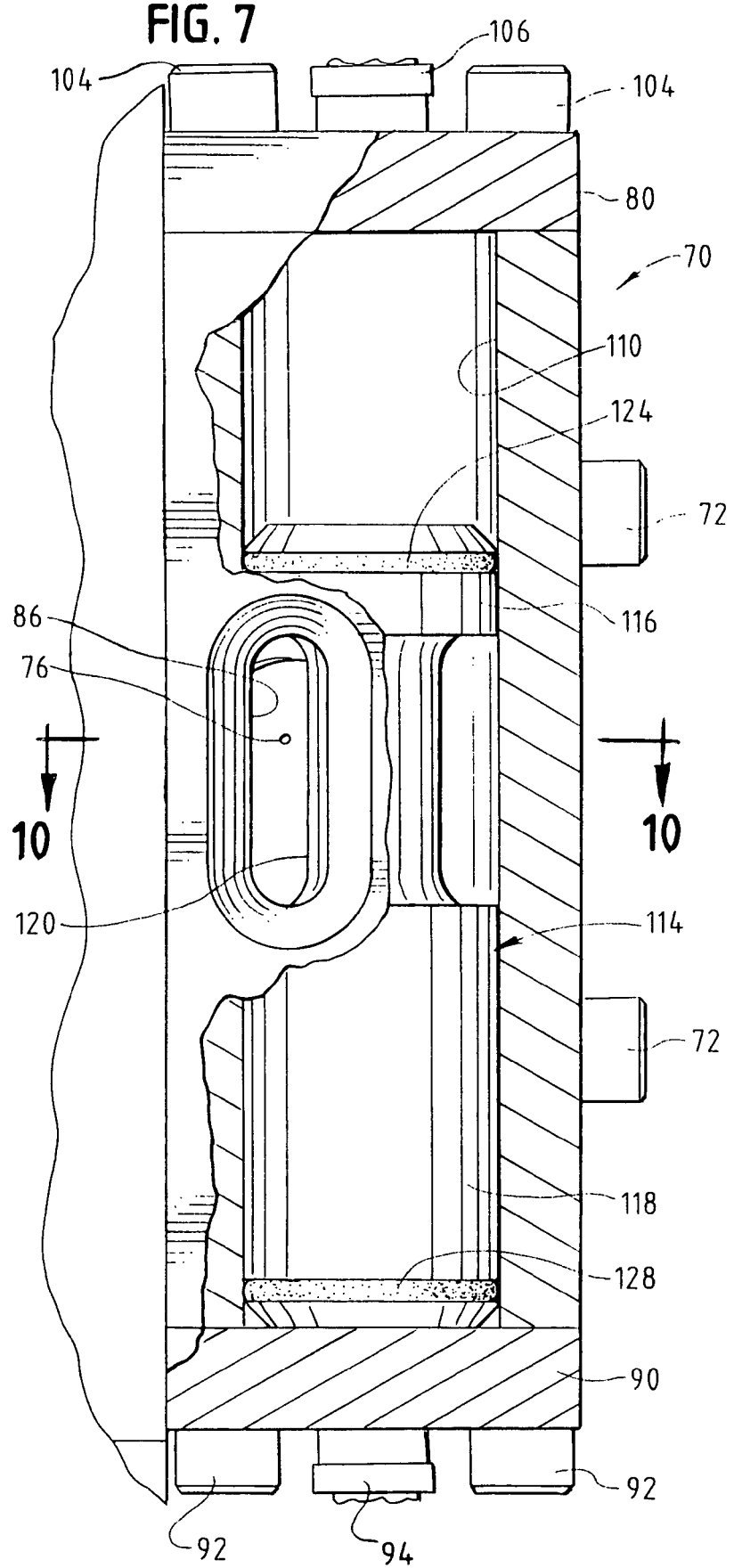
FIG. 7 is a fragmentary view of the laser sensor switch assembly taken generally along the plane 7-7 in FIG. 6.

As can be seen in FIGS. 6-8, the interior of the switch block 70 defines a bore 110 for receiving a spool or actuator 114 which has a short upper end portion or first piston 116, a longer lower end portion or second piston 118, and a reduced diameter intermediate portion which connects the upper end portion 116 to the lower end portion 118. All three portions, the upper end portion 116, the lower end portion 118, and the intermediate portion 120 are each generally cylindrical and are aligned on a common longitudinal axis within the bore 110.

Figure 9:
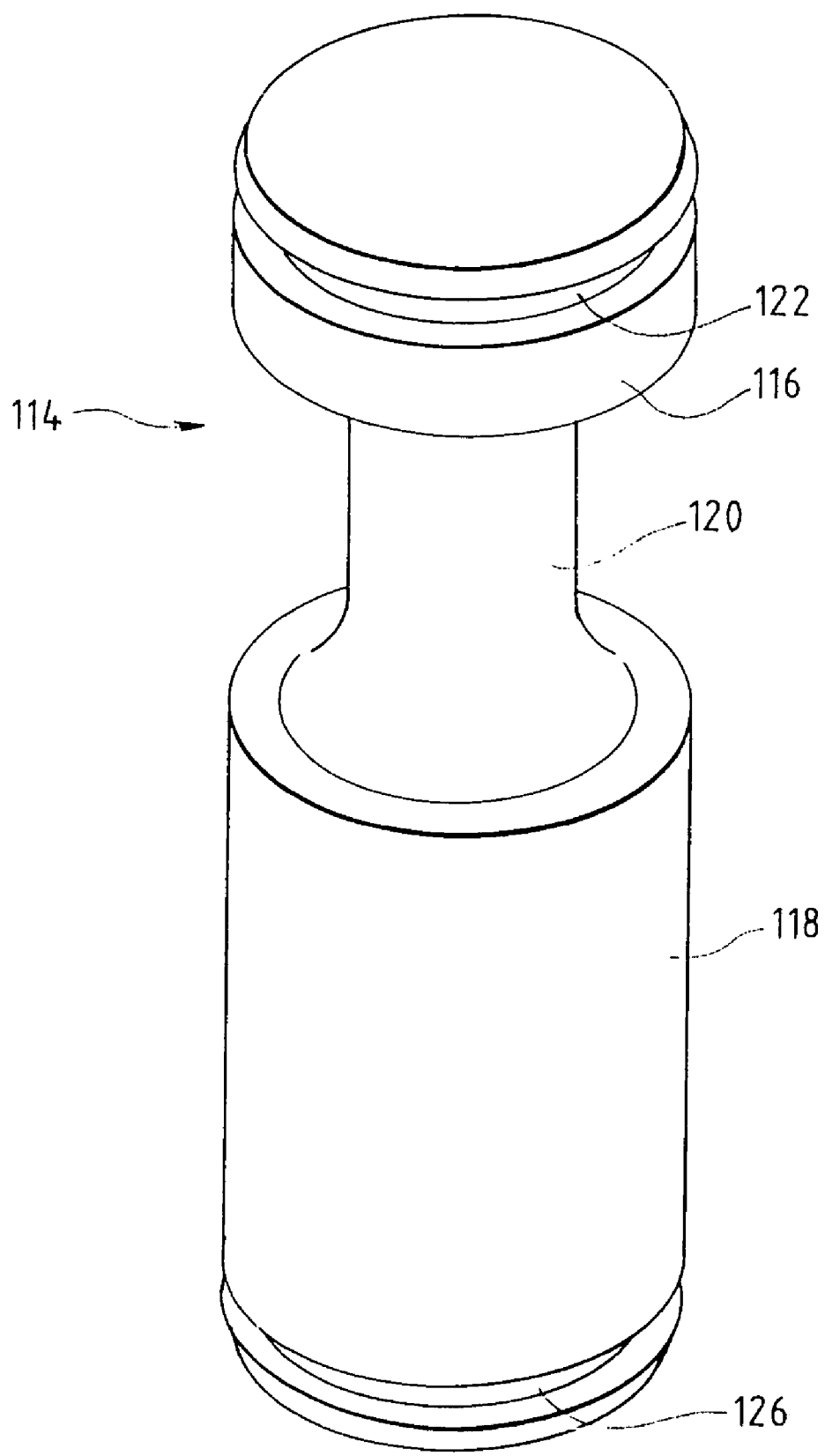
FIG. 9 is a perspective view of the movable spool or actuator of a pneumatic actuator system employed in the housing for the laser sensor switch.

The short upper end portion or first piston 116 defines a groove 122 (FIG. 9) for receiving a piston sealing ring 124 (FIGS. 7 and 8), and the longer lower end portion or second piston 118 defines an annular groove 126 (FIG. 9) for receiving a piston sealing ring 128 (FIGS. 7 and 8).

Figure 10:
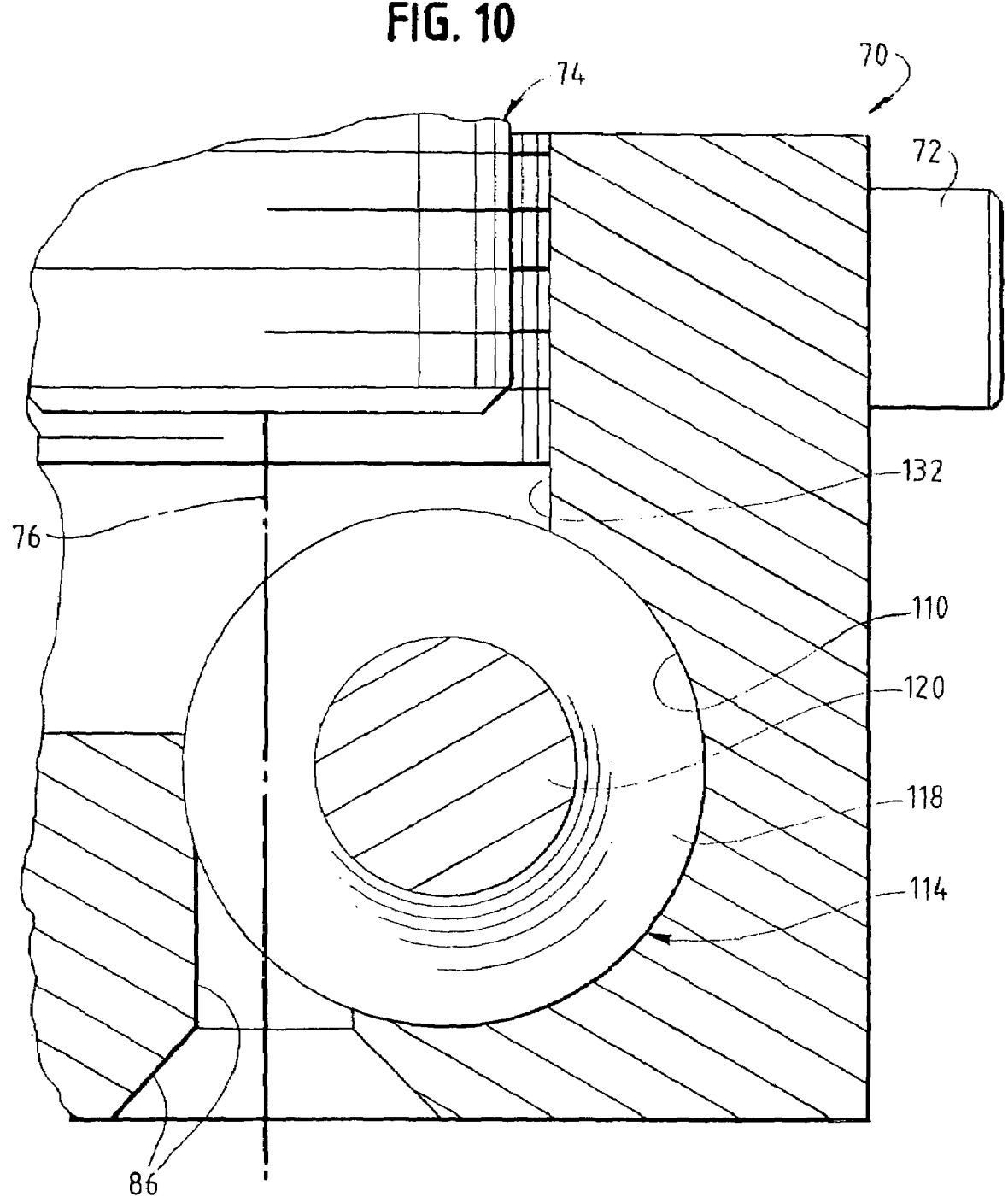
FIG. 10 is a greatly enlarged, fragmentary, cross-sectional view taken generally along the plane 10-10 in FIG. 7.
Figure 11:
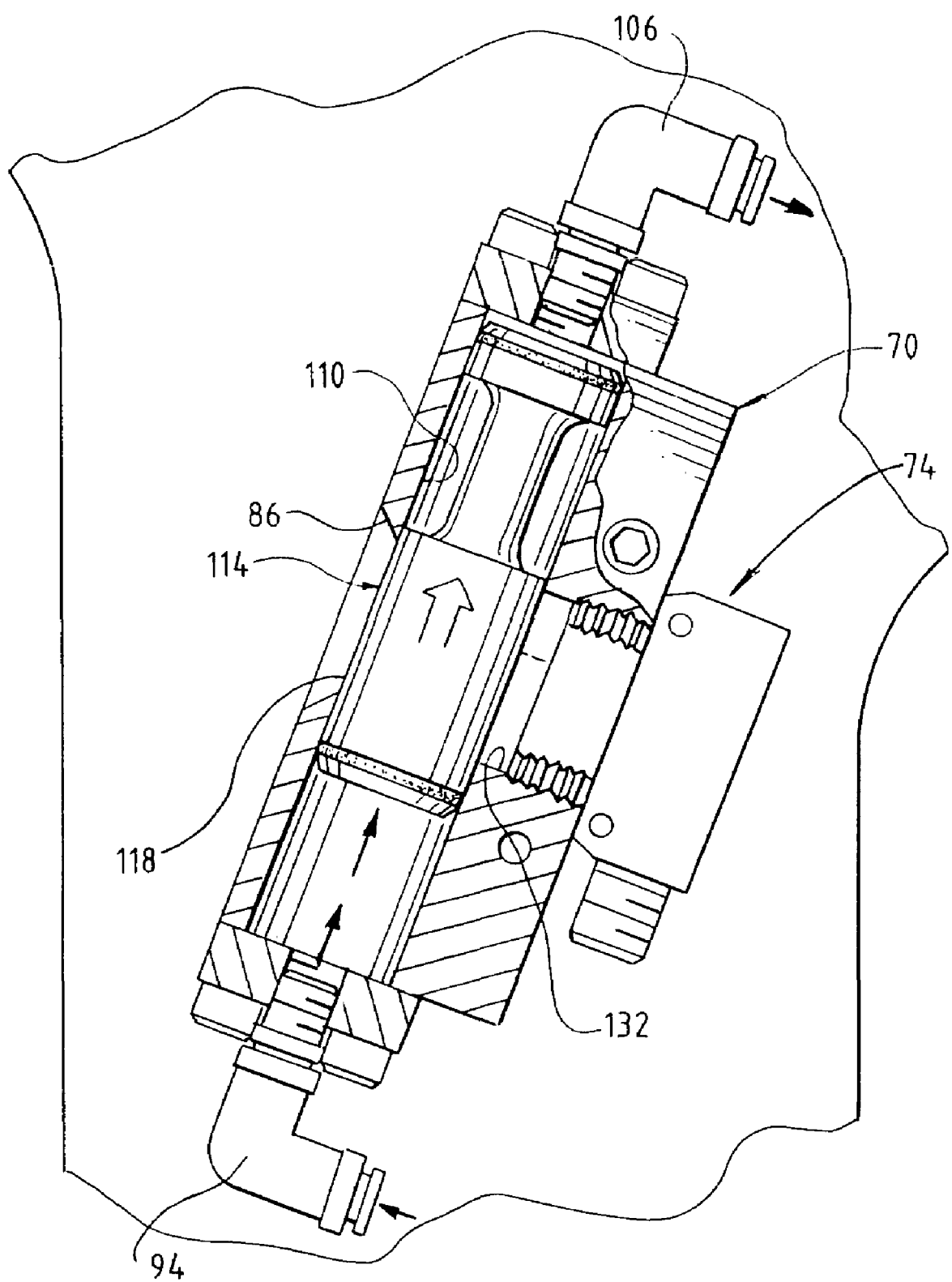
FIG. 11 is a view similar to FIG. 6, but FIG. 11 shows the spool or actuator in an elevated, moved, closed position for blocking the laser light beam from the laser sensor switch and for functioning as a protective shield.

As can be seen in FIGS. 10 and 11, the switch block 70 has a transverse passage 132 which communicates with the bore 110 and aperture 86 and which receives a portion of the laser sensor switch 74 mounted therein so as to be generally aligned with the aperture 86. As can be seen in FIG. 10, the bore 110 is laterally offset somewhat from the aperture 86 and laser sensor switch 74 so that the reduced diameter intermediate portion 120 of the spool or actuator 114 does not block the laser light beam 76 (or the beam reflected back from the reflector 80 into the laser sensor switch 74). The non-interfering relationship between the laser light beam 76 and the reduced diameter intermediate portion 120 of the actuator 114 is also clearly seen in FIG. 7. The reduced diameter intermediate portion 120 maybe characterized as defining an undercut or recess though which the light may pass between the two larger diameter pistons 116 and 118.

With reference to FIG. 7, it will be appreciated that the diameter of the lower end portion 118 is sufficiently large so that if the actuator 114 is moved to the elevated position shown in FIG. 11, the lower end portion 118 will block the laser light beam 76 and will also function to provide a protective barrier that seals the interior end of the laser sensor switch 74 from the exterior environment. This will protect the laser sensor switch 74 from a dirty ambient atmosphere that may contain particulates, gases, and liquid materials.

The actuator 114 can be moved from the lower, "open" position illustrated in FIG. 6 to the upper, "closed" position illustrated in FIG. 11 by pressurizing the bottom end of the lower end portion 118 (with pressurized air introduced through the fitting 94), and by permitting the volume of the bore 110 above the upper end portion 116 to be exhausted (through the fitting 106). The actuator 114 can be moved to, and maintained at, the lowered position illustrated in FIG. 6 by pressurizing the top of the upper end portion 116 (through the fitting 106) while permitting the volume of the bore 110 below the bottom of the lower end portion 118 to exhaust (through the fitting 94).

When the actuator 114 is maintained in the lowered, "open" position illustrated in FIG. 6, the laser light beam 76 is emitted at an oblique angle relative to the width of the processing path in which the workpiece 20 is disposed so that the emitted beam 76 will be directed to the reflector 80 in the clamp pad 38 of the vertical hold-down 30 if the vertical hold-down 30 is at a predetermined, intialization elevation relative to the laser sensor switch 74 in the switch block 70 mounted to the Y-axis frame spindle axis plate 32.

Figure 3:
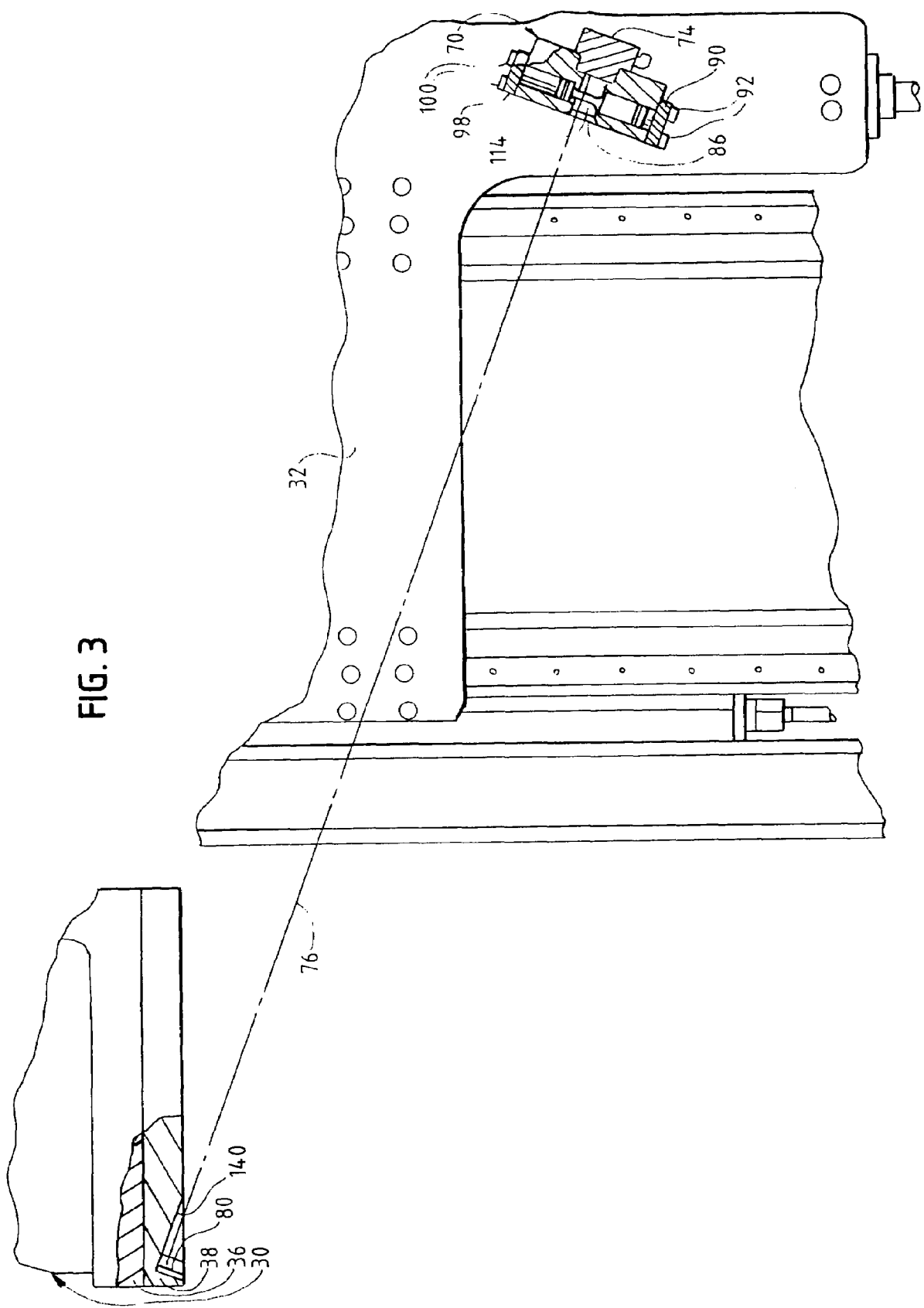
FIG. 3 is a fragmentary view similar to FIG. 2, but FIG. 3 is somewhat enlarged compared to FIG. 2.
Figure 4:
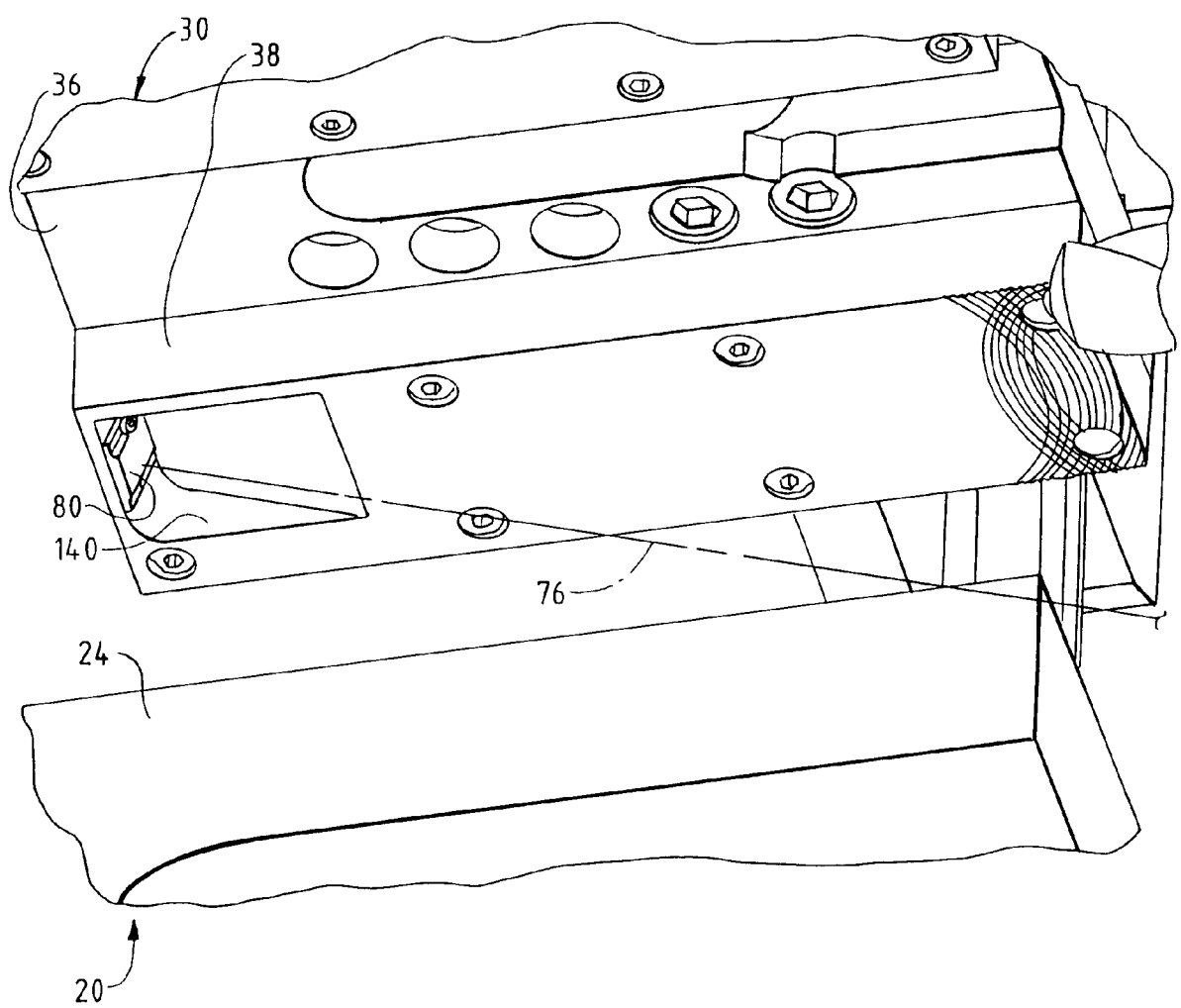
FIG. 4 is a fragmentary, perspective view showing the underside of the single spindle drill line clamp pad.

As shown in FIGS. 3 and 4, the reflector 80 is mounted within a recess 140 in the vertical hold-down clamp pad 38. The reflector 80 may be any suitable reflecting device. A presently preferred embodiment is a polarized reflector 80 having a generally planar reflecting surface, and is sold under the part number designation BRT-32X20AM in the United States of America by Banner Engineering Corp., 9714 10$^{th}$ Avenue North, Minneapolis, Minn. 55441.

While the detailed design of the particular reflector 80 forms no part of the present invention, the present invention provides for a unique positioning and mounting of the reflector 80. In particular, the mounting of the reflector 80 in the recess 140 serves to minimize the likelihood of damage to the reflector 80. Further, the location of the recess 140 and reflector 80 in the clamp pad 38 of the vertical hold-down 30 permits the reflector 80 to be initially positioned above the workpiece 20 and to be protected from damage when the hold-down 30 is subsequently moved downwardly into the clamping position to clamp the workpiece 20 with the clamp pad 38.

With this unique arrangement, the reflector 80 can be maintained at the same distance from the laser sensor switch 74 during initialization wherein the location of the end of the workpiece 20 is determined. Because of the arrangement of the reflector 80 in the recess 140 of the clamp pad 38 of the vertical hold-down 30, the laser light beam 76 does not need to be directed completely across the entire width of the processing line. Instead, as shown in FIG. 2, the laser light beam 76 merely needs to be directed at an oblique angle upwardly through only a corner of the processing path of the workpiece 20 to the reflector 80 which is maintained above the workpiece 20. The distance between the laser sensor switch 74 and the reflector 80 can thus be kept relatively short so as to insure good transmission of the laser light beam 76 to the reflector 80, and to insure good reflectance of the light beam back from the reflector 80 to the sensor in the laser sensor switch 74.

A presently preferred operation of the workpiece edge locating system of the present invention will now be described. The Y-axis frame 28 is initially moved to, or near, one end of the processing line. In the system illustrated in FIG. 1, the Y-axis frame 28 is initially moved to the front end of the processing line.

The vertical hold-down 30 and the spindle axis plate 32 are each moved upwardly on the Y-axis frame 28 to predetermined vertical elevations or positions so that they are in a predetermined vertical relationship relative to each other on the Y-axis frame 28. The initial elevations of the vertical hold-down 30 and spindle axis plate 32 are typically set so that the clamp pad 38 on the hold-down 30 will be initially spaced above the workpieces 20 that are to be moved onto the in-feed table and processed on the line.

When the hold-down 30 and spindle axis plate 32 are in the initial, elevated relationship as shown in FIG. 2, the laser light beam 76 from the laser sensor switch 74 is in alignment so as to target the reflector 80 and to be reflected back into the sensor in the laser sensor switch 74 (see FIG. 3). Typically the switch block spool or actuator 114 would be in the normally closed, raised position (FIG. 11) to protect the laser sensor switch 74 until it is necessary to detect the location of the edge of a workpiece 20.

Figure 12:
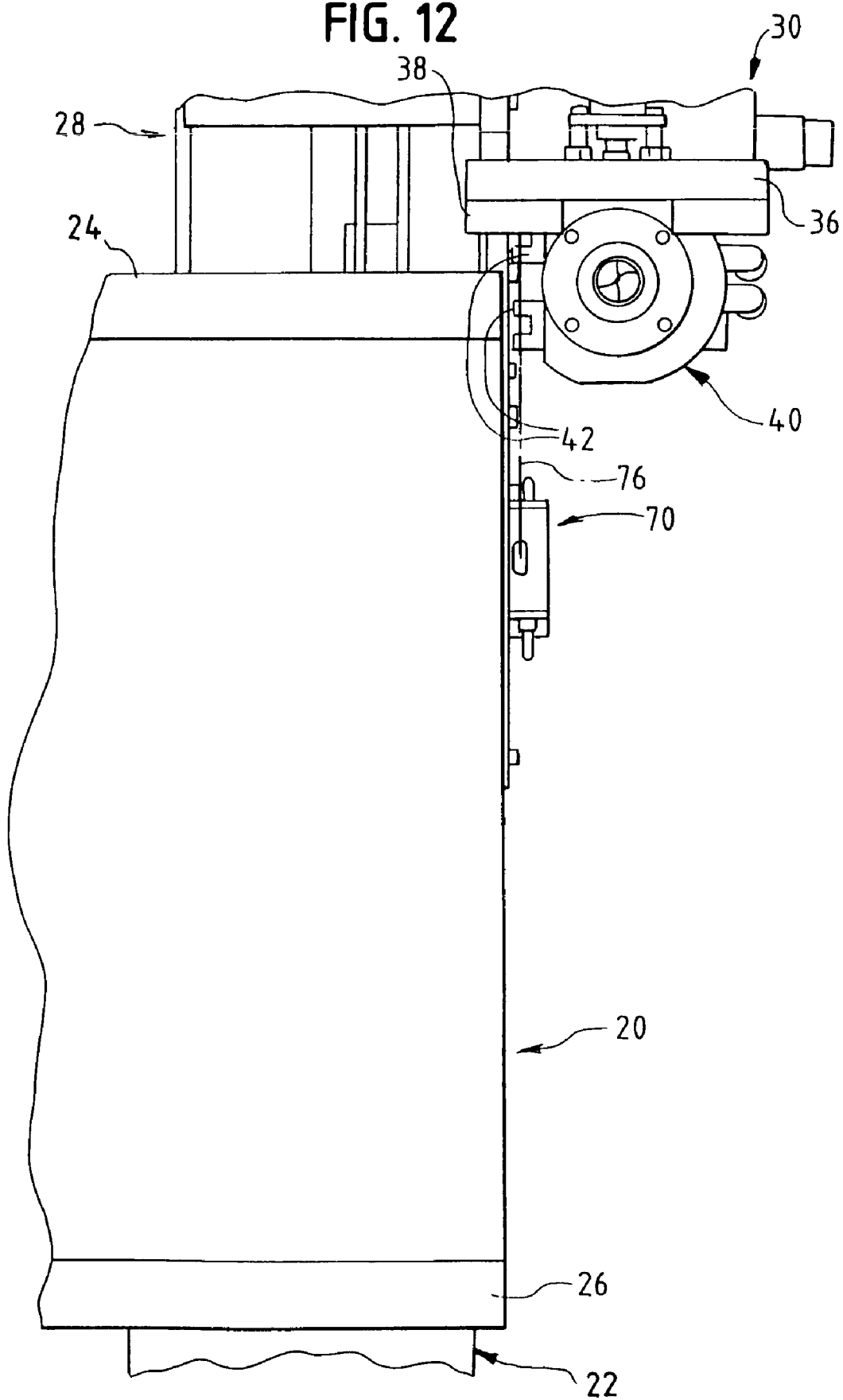
FIG. 12 is a fragmentary, side elevational view taken generally along the plane 12-12 in FIG. 2.

According to one way of initially operating the system, the workpiece 20 could be positioned on the in-feed table 22 so that the leading or front end of the workpiece 20 extends forwardly beyond the reflector 80 and laser switch 74 so as to initially block the laser light beam 76, and such an operation is described in more detail hereinafter. However, according to a preferred operation of the system, when a workpiece 20 is moved along the in-feed table 22, the workpiece 20 is not moved all the way to the front end of the in-feed table 22. Rather, the workpiece 20 is positioned so that the leading or front end of the workpiece 20 stops short of, and does not overlap, the reflector 80 and laser sensor switch 74. If FIG. 12 illustrates the preferred initial relationship where the workpiece leading end edge is positioned so that it will not block the laser light beam 76 that is emitted when the spool, or actuator 114 in the switch block 70 is moved to the lowered, open position (FIG. 3) so that the laser beam 76 is emitted at an oblique angle (through only a portion of the projected transverse width of the workpiece 20) to shine on the reflector 80 and be reflected back to the laser sensor switch 74.

Next, with the hold-down 30 still elevated and in a predetermined, vertical relationship with the elevated spindle axis plate 32, the Y-axis frame 28 is moved along the X-axis of the machine toward the rear end of the workpiece 20 until the laser light beam 76 is interrupted or broken by the front end leading edge of the workpiece 20. At that point, the light sensor in the laser sensor switch 74 (FIG. 2) no longer receives and senses the reflected laser light beam. This results in a change of state of the sensor in the laser sensor switch. Such a change of state of the light sensor may be characterized as changing from an actuated state (when the light is being sensed) to a neutral state (when the light is not being sensed). The change of state actuates the control system to record the location of the Y-axis frame along the X-axis as the "zero" location at which the laser light beam 76 is first blocked by the leading end edge of the workpiece 20.

According to another way of initially operating the system as briefly referred to above, the workpiece 20 could be initially positioned on the in-feed table 22 so that the leading or front end of the workpiece 20 blocks the laser light beam from being reflected back to the laser sensor switch 74. In that situation, with the hold-down 30 still elevated and in a predetermined, vertical relationship with the elevated spindle axis plate 32, the Y-axis frame 28 is moved along the X-axis of the machine toward the front end of the workpiece 20 until the laser light beam 76 moves just past the front end leading edge of the workpiece 20 and is no longer interrupted by the workpiece 20. At that point, the light sensor in the laser sensor switch 74 (FIG. 2) now initially receives and senses the reflected laser light beam. This results in a change of state of the sensor in the sensor switch 74. Such a change of state of the light sensor may be characterized as changing from a neutral state (when the light is not being sensed) to an actuated state (when the light is being sensed). The change of state actuates the control system to record the location of the Y-axis frame along the X-axis as the "zero" location at which the laser light beam 76 is first able to shine past the front end leading edge of the workpiece 20 to the reflector 80 and to be reflected back into the sensor in the laser sensor switch 74 (FIG. 3).

In any event, each of the above-described, two, alternate ways of initially operating the system both function to determine the front end leading edge of the workpiece 20 relative to the Y-axis frame 28. The distance between the laser light beam 76 and the center of the drill bit of the drill spindle 40 is a known, predetermined, fixed distance. The control system can then determine how far the Y-axis frame 28 needs to be moved toward the rear end of the workpiece 20 so as to position the drill spindle 40 at the appropriate X-axis location for drilling the first hole. The use of the change of state of the light beam sensor to determine the leading end edge of the workpiece (from which the subsequent X-axis positions of the Y-axis frame 28 are measured or based) can be implemented by suitable conventional or special control system, the details of which form no part of the present invention.

When the Y-axis frame 28 has been moved toward the rear end of the workpiece 20 to the first desired X-axis location for drilling a hole, the vertical hold-down 30 can be moved vertically downwardly on the Y-axis frame 28 to bring the clamp pad 38 into engagement with the upper flange 24 of the workpiece 20 so as to clamp the workpiece 20 on the in-feed table 22. The spindle axis plate 32 is also moved downwardly at that time (or before) to the desired vertical position along the height of the workpiece 20 so as to locate the drill spindle 40 at the correct Y-axis elevation for drilling the hole in the workpiece 20.

Figure 13:
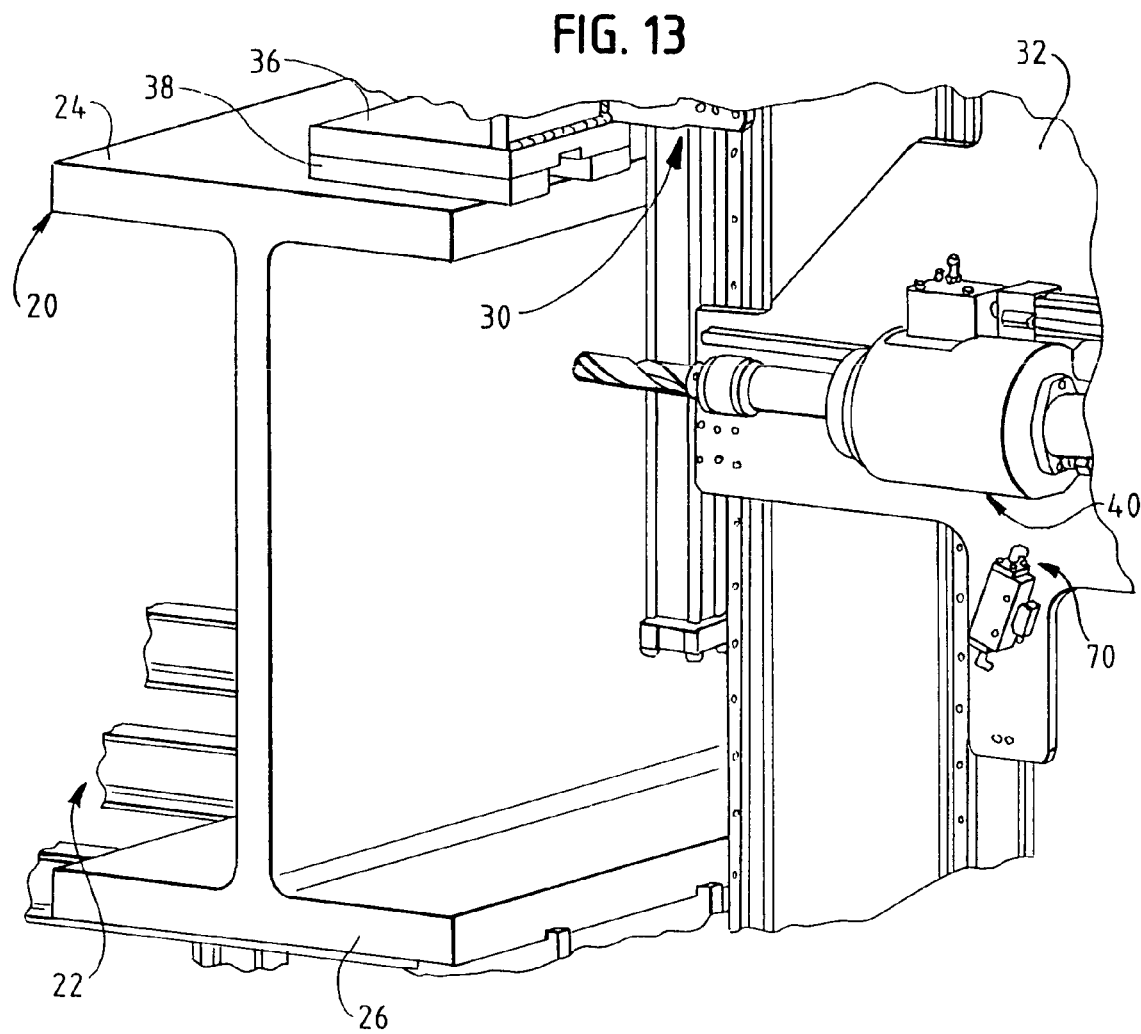
FIG. 13 is an enlarged, perspective view similar to FIG. 1, but FIG. 13 shows the line after the drill spindle axis plate has been lowered to position the drill to a predetermined location and after the vertical hold-down plate has been lowered to bring the hold-down clamp pad against the upper surface of the flange of the beam.
Figure 14:
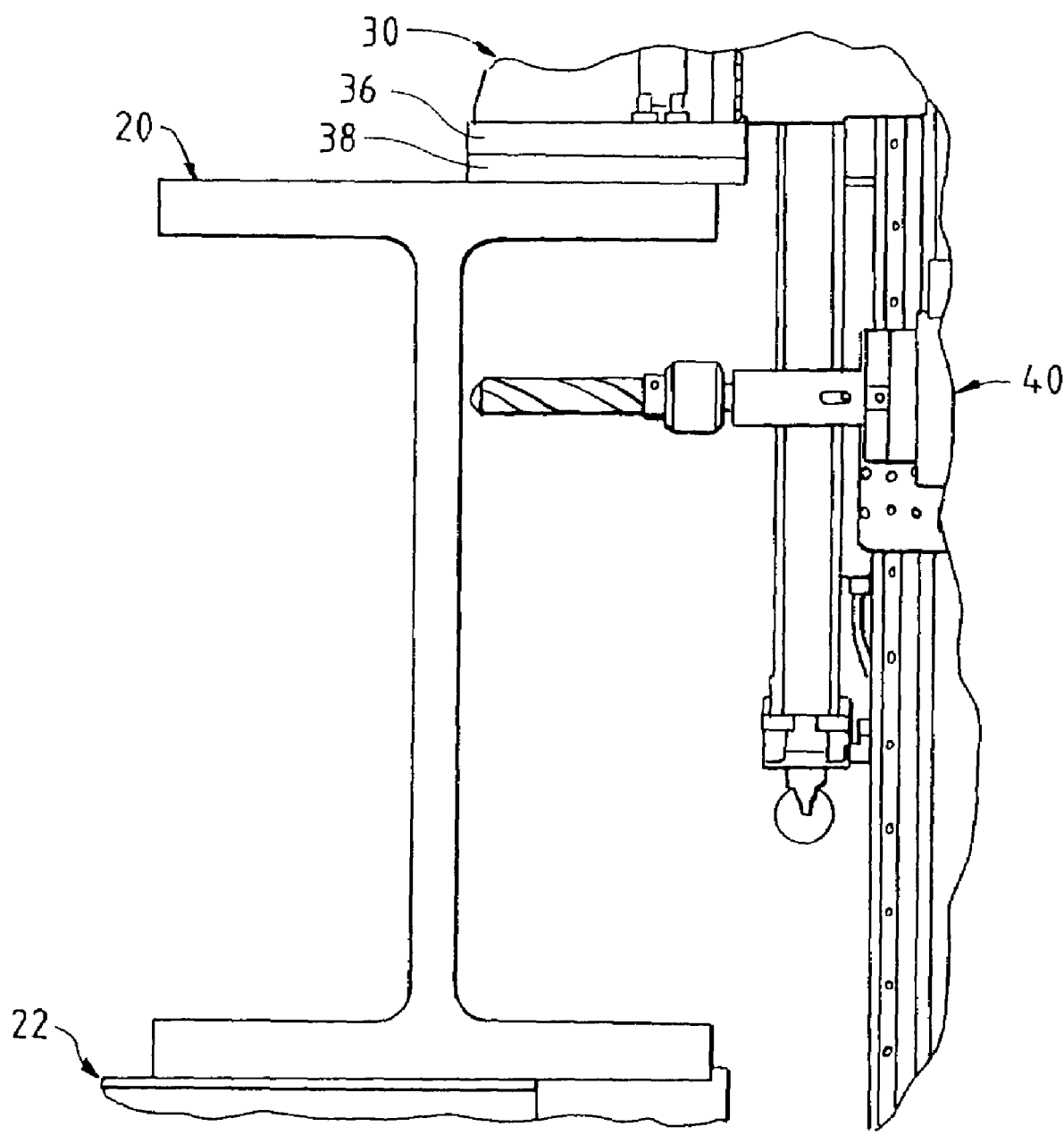
FIG. 14 is a fragmentary, front view of the line showing the components in the moved positions illustrated in FIG. 13.
Figure 15:
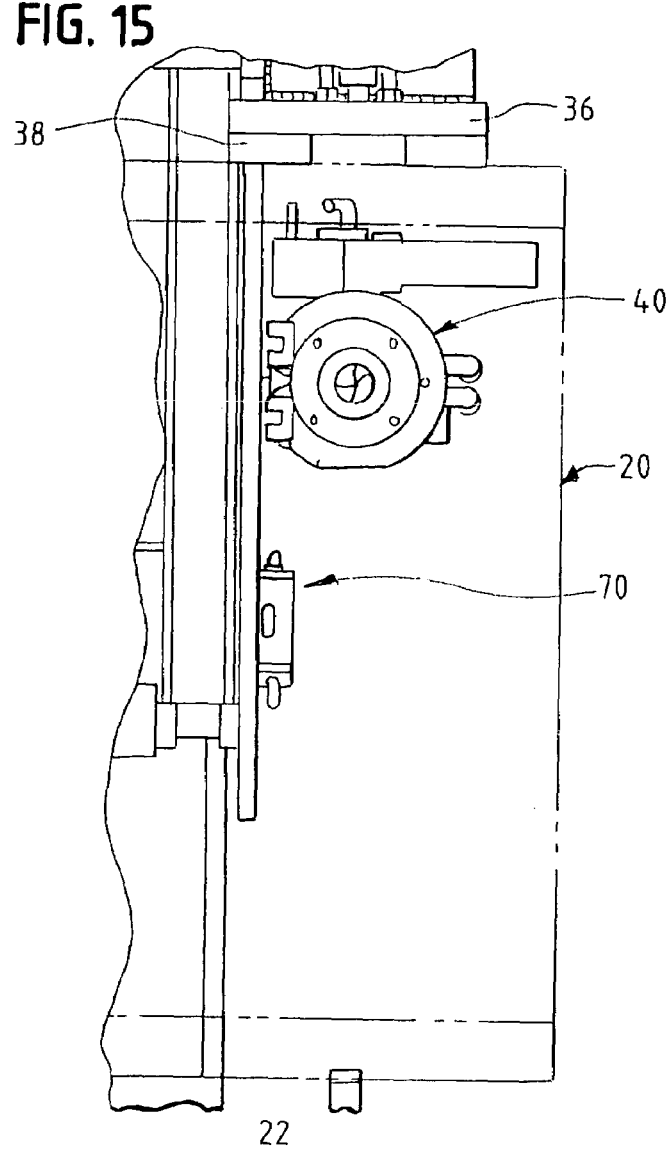
FIG. 15 is a fragmentary, side elevational view of the line showing the components in the moved positions illustrated in FIGS. 13 and 14, and FIG. 15 the beam is illustrated in phantom lines.

FIGS. 13-15 show the lowered position of the clamp pad 38 to hold the workpiece 20 on the in-feed table 22 and show the lowered position of the drill spindle 40 at a location where a hole is to be drilled in the workpiece 20. As explained above, the system for determining the vertical position of the drill spindle 40 relative to the workpiece 20 may be of any suitable conventional or special design, the details of which form no part of the present invention.

One or more holes may be drilled in the workpiece 20 at the first X-axis position along the workpiece 20 to which the Y-axis frame 28 has been moved. Subsequently, the Y-axis frame 28 may be moved further rearwardly along the workpiece 20 to one or more additional X-axis locations of holes that are to be drilled in the workpiece 20.

It will be appreciated that the novel use of the reflector 80 and novel placement of the reflector 80 in the system of the present invention substantially eliminates, or at least greatly minimizes, false signals that might occur and cause incorrect initialization or zeroing of the workpiece edge. The single laser sensor switch 74 is preferably located very close to the drill spindle 40 (or other processing assembly that may be employed in the processing line). The angular orientation of the laser light beam 76 permits the reflector 80 to be pocketed in a protective recess 140 in the hold-down clamp pad 38 so as to minimize the potential for damage to the reflector 80 during use of the system. Because the system can be operated in a preferred manner wherein the reflector 80 is always the same distance from the laser sensor switch 74 during operation of the laser sensor switch, there is no deviation when the laser sensor switch changes state or trips.

The novel system of the present invention is generally unaffected by changes in the surface material in the workpiece (e.g., color, rust, paint, or liquids on the material). Because the laser sensor switch 74 can be sealed or generally closed within the housing 70 by the spool or actuator 114, the laser sensor switch 74 is protected from outside contaminants (such as metal chips created during drilling, spray mist coolant, scale and rust sloughing from the workpiece, etc.) during operation of the workpiece machining processes (e.g., drilling holes).

Figure 16:
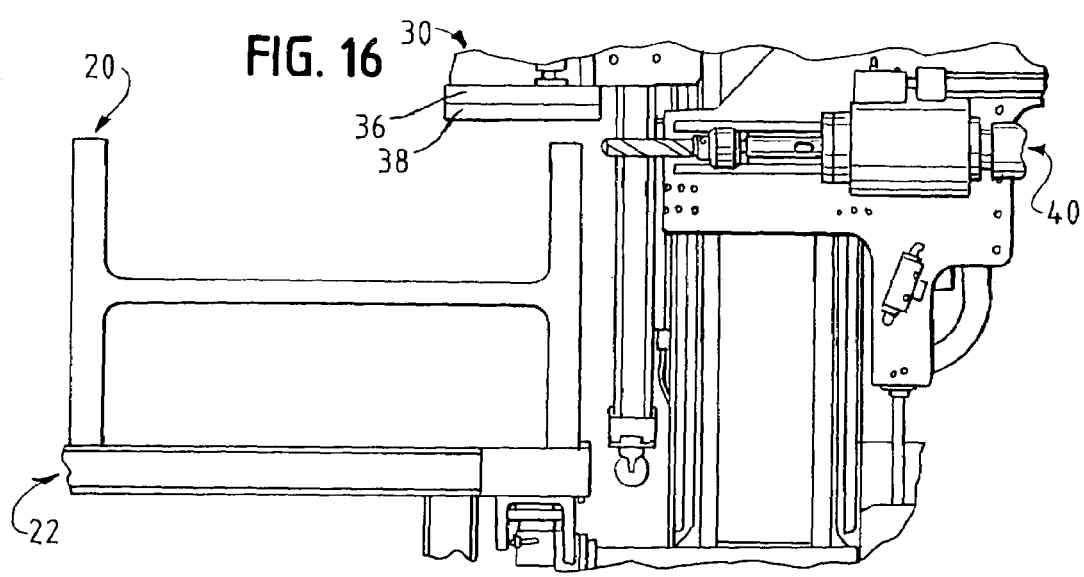
FIG. 16 is a view similar to FIG. 2, but FIG. 16 shows a new beam that is to be drilled and that is oriented 90 degrees from the beam illustrated in FIG. 2.

FIG. 16 is a view similar to FIG. 2 and shows a new, second workpiece in the form of a structural steel wide-flange beam that is oriented 90 degrees from the first beam illustrated as the first workpiece 20 in FIG. 14.

Figure 17:
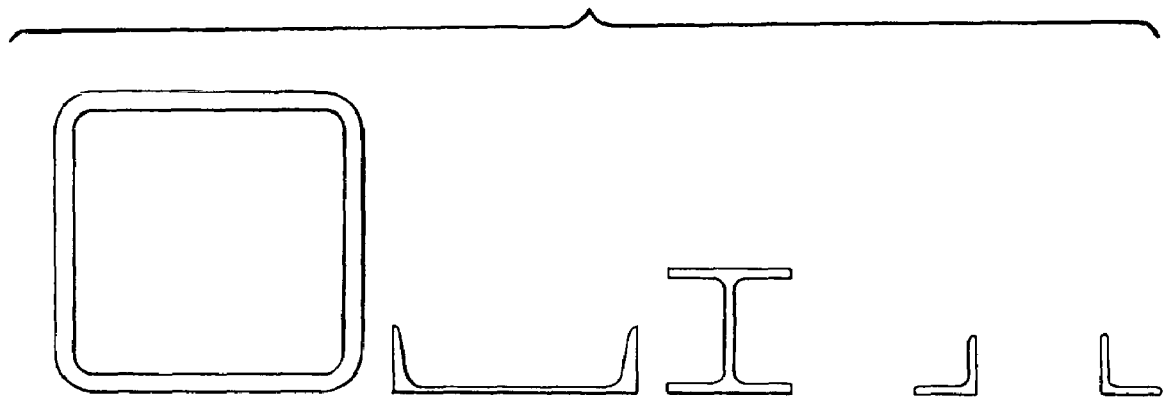
FIG. 17 shows a variety of structural members which may be processed on the line employing the system of the present invention.

FIG. 17 illustrates other workpieces in the form of structural members which have a variety of other shapes and which may be processed with the system of the present invention. FIG. 17 is not intended to show all of the shapes of a workpiece with which the system of the present invention may be used. The system of the present invention may be used with other shapes, including flat plates.

The system has so far been described with reference to determining the front end leading edge of a workpiece 20. It will be appreciated that the system may be employed in an analogous manner with respect to locating the rear end trailing edge of a workpiece 20 or with respect to detecting and establishing the location of some other edge of a workpiece (depending upon the orientation of the workpiece, the reflector 80, and the laser sensor switch 74).

Depending on distances and conditions, a full spectrum light source could be used in place of a laser light source. Further, the light beam (laser or full spectrum) need not lie in a plane that is exactly perpendicular to the length of the processing path (e.g., X-axis), although that is the preferred embodiment illustrated in the figures. The light beam could instead lie in a plane that is at an oblique angle to the length of the processing path provided that (1) the reflector is also angled as necessary to direct the reflected beam to the sensor, and (2) the control system accounts for the distance of the X-axis offset between the reflector and the sensor.

It will be readily apparent from the foregoing detailed description of the invention and from the illustrations thereof that numerous variations and modifications may be effected without departing from the true spirit and scope of the novel concepts or principles of this invention.

What is claimed is:

1. A system for locating an edge of a workpiece in a processing path, said system comprising:
    (A) a light source that
        (1) is located laterally adjacent said processing path, and
        (2) is oriented to emit a light beam at an oblique angle relative to the width of said processing path so that said emitted light beam can be directed to
            (a) pass transversely through only a portion of the projected transverse cross section of the workpiece in the processing path beyond the workpiece, and
            (b) extend to a target region adjacent the processing path either above or below the projected transverse cross section of the workpiece;
    (B) a sensor switch for receiving a reflected light beam wherein the switch is maintained in a first switched state by the presence of a reflected light beam and is maintained in a second switched state by the absence of a reflected light beam; and
    (C) a reflector at said target region for reflecting said light beam to said sensor switch when the light beam is not interrupted by the workpiece.

2. The system in accordance with claim 1 in which said sensor switch and said light source are each part of a laser sensor switch that operates to emit said light beam in the form of a laser light beam and that operates to receive and sense the presence or absence of a reflected laser light beam wherein the laser sensor switch is maintained in a first switched state by the presence of the reflected laser light beam and is maintained in a second switched state by the absence of the reflected laser light beam.

3. A system for locating an edge of a workpiece in a processing path, said system comprising:
    (A) a light source that
        (1) is located laterally adjacent said processing path, and
        (2) is oriented to emit a light beam at an oblique angle relative to the width of said processing path so that said emitted light beam can be directed to
            (a) pass transversely through only a portion of the projected transverse cross section of the workpiece in the processing path beyond the workpiece, and
            (b) extend to a target region adjacent the processing path;
    (B) a sensor switch for receiving a reflected light beam wherein the switch is maintained in a first switched state by the presence of a reflected light beam and is maintained in a second switched state by the absence of a reflected light beam; and
    (C) a reflector at said target region for reflecting said light beam to said sensor switch when the light beam is not interrupted by the workpiece; and wherein
    (A) said system further includes a workpiece clamp that is movable independently of said workpiece longitudinally along said processing path;
    (B) said reflector is mounted on said workpiece clamp; and
    (C) said sensor switch is mounted together with said light source for movement longitudinally along said processing path to correspond with the longitudinal movement of said clamp along said processing path.

4. The system in accordance with claim 3 in which said reflector is disposed within a protective recess defined in said clamp.

5. The system in accordance with claim 3 in which said light source is mounted behind a double acting actuator having an open position and a closed position, and further having first and second pistons connected by an intermediate portion wherein said second piston blocks said light beam when said actuator is in said closed position and wherein said intermediate portion defines a recess through which said light beam can pass when said actuator is in said open position.

6. A system for locating an edge of a workpiece in a processing path, said system comprising:
    (A) a clamp for engaging said workpiece, said clamp defining a recess that opens toward said processing path, said clamp being movable toward and away from the processing path between a first, retracted position spaced from the workpiece and a second, extended position engaging said workpiece;
    (B) a reflector in said clamp recess;
    (C) a light source that
        (1) is located laterally adjacent said processing path,
        (2) is oriented to emit a light beam directed to said reflector when said clamp is in said first, retracted position, and
    (D) a sensor switch that can receive the light beam reflected from said reflector wherein the switch is maintained in a first switched state by the presence of the reflected light beam and is maintained in a second switched state by the absence of the reflected light beam.

7. The system in accordance with claim 6 in which said sensor switch and said light source are each part of a laser sensor switch that operates to emit said light beam in the form of a laser light beam and that operates to receive and sense the presence or absence of a reflected laser light beam wherein the laser sensor switch is maintained in a first switched state by the presence of the reflected laser light beam and is maintained in a second switched state by the absence of the reflected laser light beam.

8. A system for locating an edge of a workpiece in a processing path, said system comprising:
    (A) a laser sensor switch that
        (1) is located laterally adjacent said processing path,
        (2) sends a laser light beam and receives a reflected laser light beam wherein the laser sensor switch is maintained in a first switched state by the presence of the reflected laser light beam and is maintained in a second switched state by the absence of the reflected laser light beam, and
        (3) is oriented to emit a laser light beam at an oblique angle relative to the width of said processing path so that said emitted light beam can be directed to
            (a) pass transversely through only a portion of the projected transverse cross section of the workpiece in the processing path beyond the workpiece, and
            (b) extend to a target region adjacent the processing path either above or below the projected transverse cross section of the workpiece; and
    (B) a reflector at said target region for reflecting said laser light beam to said laser sensor switch when the laser light beam is not interrupted by the workpiece.

9. A system for locating an edge of a workpiece in a processing path, said system comprising:
(A) a laser sensor switch that
  (1) is located laterally adjacent said processing path,
  (2) sends a laser light beam and receives a reflected laser light beam wherein the laser sensor switch is maintained in a first switched state by the presence of the reflected laser light beam and is maintained in a second switched state by the absence of the reflected laser light beam, and
  (3) is oriented to emit a laser light beam at an oblique angle relative to the width of said processing path so that said emitted light beam can be directed to
    (a) pass transversely through only a portion of the projected transverse cross section of the workpiece in the processing path beyond the workpiece, and
    (b) extend to a target region adjacent the processing path; and
(B) a reflector at said target region for reflecting said laser light beam to said laser sensor switch when the laser light beam is not interrupted by the workpiece; and wherein
(A) said system further includes a workpiece clamp that is movable independently of said workpiece longitudinally along said processing path;
(B) said reflector is mounted on said workpiece clamp; and
(C) said laser sensor switch includes both a laser beam light source and a light sensor switch mounted together in a fixed relationship for movement together longitudinally along said processing path to correspond with the longitudinal movement of said clamp along said processing path.

10. The system in accordance with claim 9 in which said reflector is disposed within a protective recess defined in said clamp.

11. The system in accordance with claim 9 in which said laser sensor switch is mounted behind a double acting actuator having an open position and a closed position, and further having first and second pistons connected by an intermediate portion wherein said second piston blocks said laser light beam when said actuator is in said closed position and wherein said intermediate portion defines a recess through which said laser light beam can pass when said actuator is in said open position.

12. A system for locating an edge of a workpiece in a processing path, said system comprising:
(A) a clamp for engaging said workpiece, said clamp defining a recess that opens toward said processing path, said clamp being movable toward and away from the processing path between a first, retracted position spaced from the workpiece and a second, extended position engaging said workpiece;
(B) a reflector in said clamp recess; and
(C) a laser sensor switch that
  (1) is located laterally adjacent said processing path,
  (2) is oriented to emit a laser light beam directed to said reflector when said clamp is in said first, retracted position, and
  (3) can receive the laser light beam reflected from said reflector wherein the laser switch is maintained in a first switched state by the presence of the reflected laser light beam and is maintained in a second switched state by the absence of the reflected laser light beam.

* * * * *